United States Patent
Kifuku et al.

(10) Patent No.: US 6,687,590 B2
(45) Date of Patent: Feb. 3, 2004

(54) ELECTRIC POWER STEERING APPARATUS

(75) Inventors: Takayuki Kifuku, Tokyo (JP); Kazumichi Tsutsumi, Tokyo (JP); Chiaki Fujimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 42 days.

(21) Appl. No.: 09/987,636

(22) Filed: Nov. 15, 2001

(65) Prior Publication Data

US 2002/0177932 A1 Nov. 28, 2002

(30) Foreign Application Priority Data

May 25, 2001 (JP) ........................................ 2001-157748

(51) Int. Cl.[7] ................................................ B62D 5/04
(52) U.S. Cl. ............................ 701/43; 701/41; 180/443
(58) Field of Search ..................... 701/41, 43; 180/443, 180/446; 318/254, 139, 432

(56) References Cited

U.S. PATENT DOCUMENTS

| 4,896,735 A | | 1/1990 | Morishita et al. ........... 180/79.1 |
| 5,361,210 A | * | 11/1994 | Fu ............................... 701/41 |
| 5,682,072 A | * | 10/1997 | Takahashi ............... 310/156.46 |
| 5,988,312 A | * | 11/1999 | Nishino et al. ............. 180/446 |
| 6,124,688 A | * | 9/2000 | Coles et al. ................. 318/254 |
| 6,448,724 B1 | * | 9/2002 | Kleinau et al. ............. 318/254 |
| 6,448,738 B1 | * | 9/2002 | Burton et al. ............... 318/807 |
| 6,504,336 B2 | * | 1/2003 | Sakamaki .................... 318/727 |

FOREIGN PATENT DOCUMENTS

| JP | 1-257674 | 10/1989 |
| JP | 5-97042 | 4/1993 |
| JP | 5-112251 | 5/1993 |

* cited by examiner

*Primary Examiner*—Michael J. Zanelli
(74) *Attorney, Agent, or Firm*—Sughrue Mion, PLLC

(57) ABSTRACT

The present invention is an electric power steering apparatus which includes a multi-phase motor that assists steering effort of a driver, a motor drive circuit provided with at least an upper switching element that connects or disconnects the winding of each phase of the multi-phase motor and a power supply, and a lower switching element that connects or disconnects the winding of each phase of the multi-phase motor and grounding, a logic circuit that determines ON/OFF of the upper switching element and the lower switching element, and first and second microcontrollers that control the motor drive circuit via this logic circuit, in which the logic circuit determines ON/OFF of the upper switching element and the lower switching element so that the power to the winding of the each phase of the multi-phase motor is stopped according to the instruction of either the first microcontroller or the second microcontroller.

18 Claims, 16 Drawing Sheets

OPERATION WHEN EXCITED PHASE IS FIXED

ELECTRIC POWER STEERING APPARATUS

BACKGROUND OF THE INVENTION

1. Field of the Invention

The present invention relates to an electric power steering apparatus, and more particularly, to a fail-safe function of electric power steering for automobiles, etc. using a multi-phase motor with three or more phases such as a DC brush-less motor.

2. Description of the Prior Art

FIG. 16 is a block diagram showing a conventional electric power steering apparatus disclosed in the Japanese Patent laid-Open no. 1-257674. In FIG. 16, reference numeral 11 denotes a steering torque detector; 12, a torque signal input I/F circuit; 13, a microcomputer (CPU); 14, a motor rightward drive output I/F circuit; 15, a motor leftward drive output I/F circuit; 16, a D/A conversion circuit; 17, a differential amplification circuit; 18, a pulse width modulation circuit; 19, a PWM oscillator (OSC); 20, a motor drive circuit; 20A and 20B, AND circuits; 21, a motor current detection circuit; 22, a resistor; 23A and 23B, output terminals; 24, a motor; 25A and 25B, input terminals; 26, a motor control circuit; 27, a motor rotation drive judging block; 27A, a torque signal direction discrimination circuit; 27B, a rightward drive signal; and 27C, a leftward drive signal.

Here, the motor rotation drive judging block 17 constructs a redundant system independent of the microcomputer 13, which is the main motor controlling means. The motor rotation drive judging block 27 decides the right or left direction of the steering torque of the driver detected by the steering torque detector 11 through the torque signal direction discrimination circuit 27A and if the steering torque is rightward, allows rightward powering of the motor 24 by the motor drive circuit 20 through the rightward drive signal 27B. If the steering torque is leftward, the motor rotation drive judging block allows leftward powering through the leftward drive signal 27C.

SUMMARY OF THE INVENTION

Conventionally, a single-phase motor with a brush has been used for an electric power steering apparatus. In recent years, however, there is a demand for a more comfortable steering feeling to such an extent that friction of the brush is no longer negligible. Thus, use of a brush-less multi-phase motor, such as a three-phase DC brush-less motor for an electric power steering apparatus is under investigation.

When a single-phase motor with a brush is reversibly operated with an H-figured bridge circuit, ON/OFF of each switching element making up the H-figured bridge circuit has a one-to-one correspondence with the output torque direction of the motor. Thus, as described above, the conventional electric power steering apparatus is provided with redundant means for turning ON/OFF the switching elements according to the direction of steering torque in parallel to the main controlling means such as a microcomputer in the control apparatus and drives the motor using a logic product of the main controlling means by the redundant means. Even in the case where the main controlling means fails, this prevents the motor from generating steering auxiliary torque in the direction opposite to the steering torque or generating steering auxiliary torque when the steering torque is close to a neutral point.

On the other hand, in the case of a multi-phase motor, ON/OFF of each switching element making up the motor drive circuit does not have a one-to-one correspondence with the output torque direction of the motor. For example, in the case where a three-phase DC brush-less motor is driven by a three-phase inverter, all switching elements making up the three-phase inverter can be either ON or OFF no matter which direction of torque the motor outputs. For this reason, there is a problem that the redundant means of the conventional apparatus cannot be used.

The present invention has been implemented to solve the problem as described above and it is an object of the present invention to provide a highly reliable electric power steering apparatus incorporating a microcomputer redundant system also applicable to electric power steering using a multi-phase motor.

The electric power steering apparatus according to the present invention comprises a multi-phase motor that assists steering effort of a driver, driving means provided with at least an upper switching element that connects or disconnects the winding of each phase of the multi-phase motor and a power supply, and a lower switching element that connects or disconnects the winding of each phase of the multi-phase motor and grounding and a logic circuit that determines ON/OFF of the upper switching element and the lower switching element and first and second controlling means for controlling the driving means via the logic circuit, and characterized in that the logic circuit determines ON/OFF of the upper switching element and the lower switching element so that the power to the winding of the each phase is stopped according to the instruction of either the first control means or the second control means.

This configuration makes it possible, in an electric power steering apparatus using a multi-phase motor such as a three-phase DC brush-less motor, to construct a microcomputer redundant system that controls the motor with an extremely small amount of calculation and produces thereby an effect of improving the reliability of the apparatus.

The electric power steering apparatus according to an alternative embodiment of the present invention comprises a torque sensor that detects the steering effort of the driver, and is characterized in that the torque sensor is connected to both of the first controlling means and the second controlling means, or the torque sensor is connected to the first controlling means and the first controlling means is connected to the second controlling means to send a value of steering torque detected by the torque sensor to the second controlling means.

This configuration produces an effect of contributing to construction of a redundant system with a microcontroller appropriate for electric power steering with an extremely small amount of calculation, and also produces an effect of making it possible to implement strict monitoring with a simpler hardware configuration.

In another configuration of the electric power steering apparatus according to the present invention, the apparatus comprises a motor current detection circuit that detects a current of the multi-phase motor, and is characterized in that the motor current detection circuit is connected to both of the first controlling means and the second controlling means, or the motor current detection circuit is connected to the first controlling means and the first controlling means is connected to the second controlling means to send a detected current based on a target current at three-phase AC coordinates or a detected current based on the current detection circuit to the second controlling means.

This configuration produces an effect of contributing to construction of a redundant system with a microcontroller appropriate for electric power steering with an extremely small amount of calculation, and also produces an effect of making it possible to construct a redundant system with a microcontroller that controls the motor of the electric power steering apparatus using the multi-phase motor.

Another electric power steering apparatus according to the present invention comprises a rotor position sensor that detects the position of the rotor of the multi-phase motor, and is characterized in that the rotor position sensor is connected to both of the first controlling means and the second controlling means, or the rotor position sensor is connected to the first controlling means and the first controlling means is connected to the second controlling means to send the detected position based on the position sensor to the second controlling means.

This configuration produces an effect of contributing to construction of a redundant system with a microcontroller appropriate for electric power steering with an extremely small amount of calculation, and also produces an effect of making it possible to construct a redundant system with a microcontroller that controls the motor of the electric power steering apparatus using the multi-phase motor.

Further, the electric power steering apparatus according to the present invention can comprise a speed sensor that detects the rotation speed of the rotor of the multi-phase motor, and is characterized in that the speed sensor is connected to both of the first controlling means and the second controlling means, or the speed sensor is connected to the first controlling means and the first controlling means is connected to the second controlling means to send the detected position based on the position sensor to the second controlling means.

This configuration produces an effect of contributing to construction of a redundant system with a microcontroller appropriate for electric power steering with an extremely small amount of calculation, and also produces an effect of making it possible to construct a redundant system with a microcontroller that controls the motor of the electric power steering apparatus using the multi-phase motor.

In another embodiment, the electric power steering apparatus according to the present invention comprises a vehicle speed sensor that detects the traveling speed of the vehicle on which the electric power steering apparatus is mounted, and is characterized in that the vehicle speed sensor is connected to both of the first controlling means and the second controlling means, or the speed sensor is connected to the first controlling means and the first controlling means is connected to the second controlling means.

This configuration produces an effect of contributing to construction of a redundant system with a microcontroller appropriate for electric power steering with an extremely small amount of calculation.

Additionally, the electric power steering apparatus according to the present invention may have the logic circuit constructed to turn OFF at least one of the upper switching element and the lower switching element based on the instruction of either the first controlling means or the second controlling means.

This configuration makes it possible to reduce the circuit scale of the logic circuit, simplify the circuit configuration and contribute to cost reduction and also produces an effect of constructing a microcomputer redundant system that controls the motor of the electric power steering apparatus using a multi-phase motor.

In another alternative embodiment, the electric power steering apparatus according to the present invention may have the driving means including at least an upper switching element that connects or disconnects the winding of each phase of the multi-phase motor and a power supply, a lower switching element that connects or disconnects the winding of each phase of the multi-phase motor and grounding and switching means for connecting or disconnecting the upper or lower switching element and a power supply or grounding, and is characterized in that the logic circuit is constructed to turn OFF the switching means based on the instruction of either the first controlling means or the second controlling means.

This configuration produces an effect of interrupting power to the multi-phase motor reliably.

Further, the electric power steering apparatus according to the present invention may also have the driving means including at least an upper switching element that connects or disconnects the winding of each phase of the multi-phase motor and a power supply, a lower switching element that connects or disconnects the winding of each phase of the multi-phase motor and grounding and switching means for connecting or disconnecting the winding of each phase of the multi-phase motor and the upper or lower switching element, and is characterized in that the logic circuit is constructed to turn OFF the switching means based on the instruction of either the first controlling means or the second controlling means.

This configuration produces an effect of interrupting power to the multi-phase motor reliably.

Moreover, the electric power steering apparatus according to the present invention can be configured such that the first controlling means and the second controlling means are connected in such a way as to exchange predetermined data, monitor errors of each other based on the exchanged data and control the logic circuit in such a way as to interrupt the power to the multi-phase motor in the event of an error in the first or second controlling means.

This configuration produces an effect of allowing the first controlling means and the second controlling means to monitor each other for runaway.

Further, the electric power steering apparatus according to the present invention may be configured such that the second controlling means controls the logic circuit in such a way as to interrupt the power to the multi-phase motor in the case where the direction of steering torque does not match the direction of assisting steering effort, and to interrupt the power to the multi-phase motor in the case where steering torque is close to a neutral point whichever direction the steering effort of the driver is assisted.

This configuration produces an effect of making it possible to monitor the operation more strictly.

In a further alternative embodiment the electric power steering apparatus according to the present invention is characterized in that the second controlling means controls the logic circuit in such a way as to interrupt the power to the multi-phase motor in the case where the direction of steering torque does not match the direction of assisting steering effort, and not to interrupt the power to the multi-phase motor in the case where steering torque is close to a neutral point whichever direction the steering effort of the driver is assisted.

This configuration produces an effect of making it possible to monitor the operation more strictly, and also produces an effect of making it possible to drive the motor close to a neutral point of torque to compensate friction of the motor, etc. and improve the steering feeling.

Additionally, the electric power steering apparatus according to the present invention can be characterized in that the second controlling means controls the logic circuit in such a way as to interrupt the power to the multi-phase motor in the case where the motor output torque is excessive to the steering torque.

This configuration produces an effect of making it possible to monitor the operation more strictly.

In a further embodiment, the electric power steering apparatus according to the present invention is characterized in that the second controlling means controls the logic circuit in such a way as to interrupt the power to the multi-phase motor in the case where the relationship between the motor current at orthogonal coordinates and the motor current at three-phase AC coordinates is judged to be abnormal.

This configuration produces an effect of making it possible to construct a redundant system with a microcontroller that controls the motor of the electric power steering apparatus using the multi-phase motor.

The electric power steering apparatus according to a further alternative embodiment of the present invention is characterized in that the second controlling means controls the logic circuit in such a way as to interrupt the power to the multi-phase motor in the case where the relationship between the motor current at orthogonal coordinates, the motor current at three-phase AC coordinates and electrical angle is judged to be abnormal.

Additionally, the electric power steering apparatus according to the present invention may be characterized in that the second controlling means controls the logic circuit in such a way as to interrupt the power to the multi-phase motor in the case where the component of the motor current in the same direction as the magnetic flux created by the magnetic field is judged to be abnormal.

This configuration produces an effect of making it possible to construct a redundant system with a microcontroller that controls the motor of the electric power steering apparatus using the multi-phase motor.

The electric power steering apparatus according to yet another embodiment of the present invention is characterized in that the second controlling means controls the logic circuit in such a way as to interrupt the power to the multi-phase motor in the case where the phase angle formed by the current component of the motor current in the same direction as the magnetic flux created by the magnetic field and by the current component in the direction 90° from the magnetic flux created by the magnetic field is judged to be abnormal.

This configuration produces an effect of making it possible to construct a redundant system with a microcontroller that controls the motor of the electric power steering apparatus using the multi-phase motor.

Alternatively, the electric power steering apparatus according to the present invention can be characterized in that the logic circuit is controlled in such a way as to interrupt the power to the multi-phase motor when the condition for interrupting the power to the multi-phase motor continues for a predetermined time.

This configuration produces an effect of making it possible to prevent hunting during power interruption.

In another exemplary embodiment of the electric power steering apparatus according to the present invention, when judged abnormal, the power to the multi-phase motor is interrupted until the first controlling means or the second controlling means is power-on reset.

This configuration produces an effect of making it possible to provide a fail-safe action until the second controlling means is recovered from the error.

DETAILED DESCRIPTION OF THE PREFFERED EMBODIMENTS

First Embodiment

Figure 1:
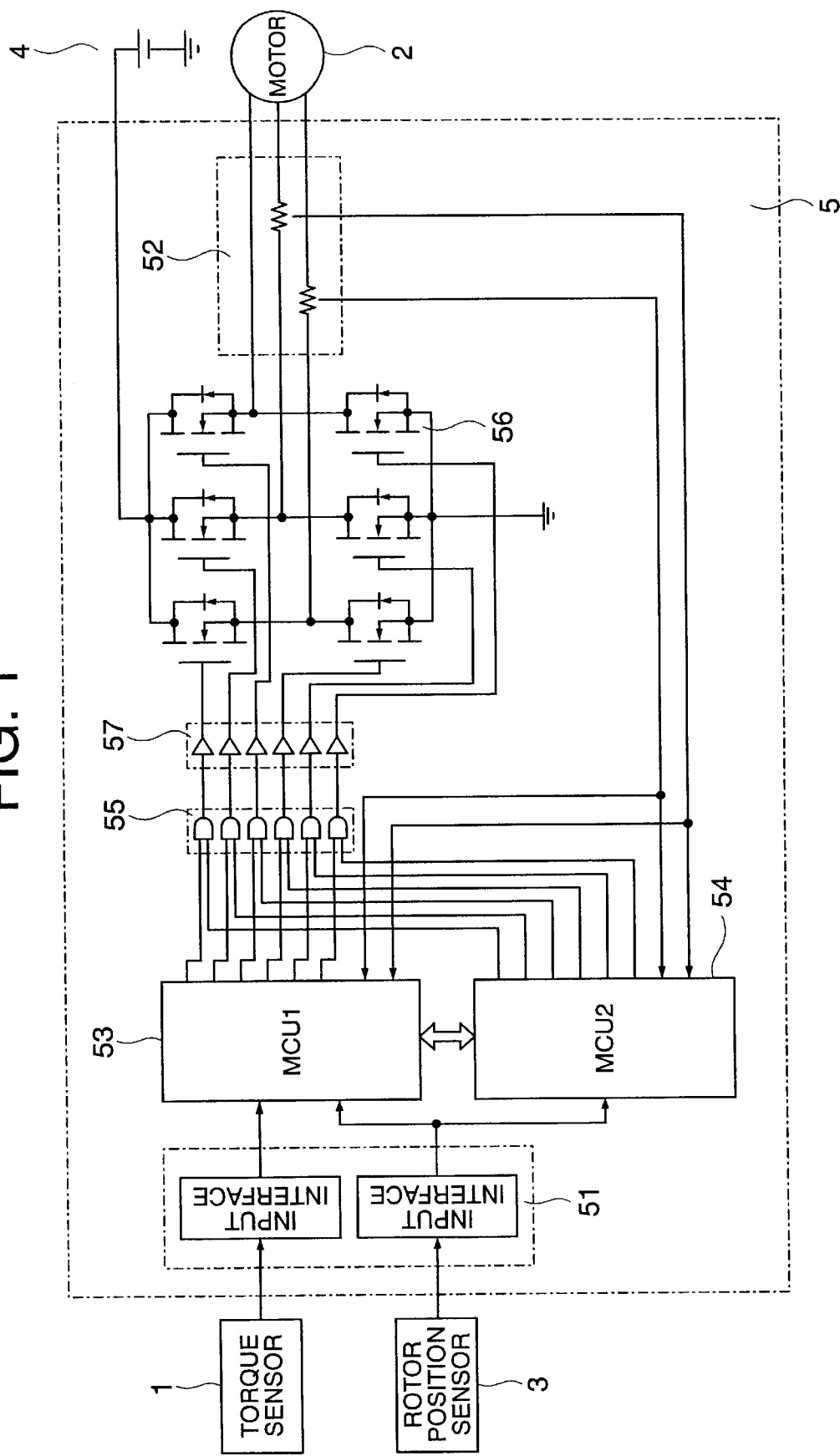
FIG. 1 is a block diagram showing an electric power steering apparatus according to Embodiment 1 of the present invention.

FIG. 1 is a block diagram showing an electric power steering apparatus according to Embodiment 1 of the present invention.

In the diagram, reference numeral 1 denotes a torque sensor to detect steering effort of the driver and reference numeral 2 denotes a motor to assist the steering effort of the driver and a three-phase DC brush-less motor is used here. Reference numeral 3 denotes a rotor position sensor to detect the position of the rotor of the motor 2; 4, a battery to supply power to the motor 2; and 5, a controller to control the motor 2 based on the torque sensor 1.

The following are the components of the controller 5. Reference numeral 51 denotes an input interface circuit for the torque sensor 1 and rotor position sensor 3; 52, a motor current detection circuit that detects a phase current of the motor 2; 53, a first microcontroller (MCU1) as first controlling means for controlling the motor 2 based on the torque sensor 1, rotor position sensor 3 and motor current detection circuit 52; 54, a second microcontroller (MCU2) as second controlling means for enabling or disabling the first microcontroller 53 to drive the motor 2 based on the rotor position sensor 3 and motor current detection circuit 52 and is connected to the output side of the first microcontroller 53 by a logic circuit 55. Reference numeral 56 denotes a motor drive circuit to drive the motor 2 and is a three-phase full bridge circuit made up of a plurality of switching elements (upper switching element and lower switching element). Reference numeral 57 denotes a pre-driver that amplifies the current of the output of the logic circuit 55, converts the output to a predetermined voltage level and drives the motor drive circuit 56. The motor drive circuit 56 and pre-driver 57 construct the driving means.

Figure 2:
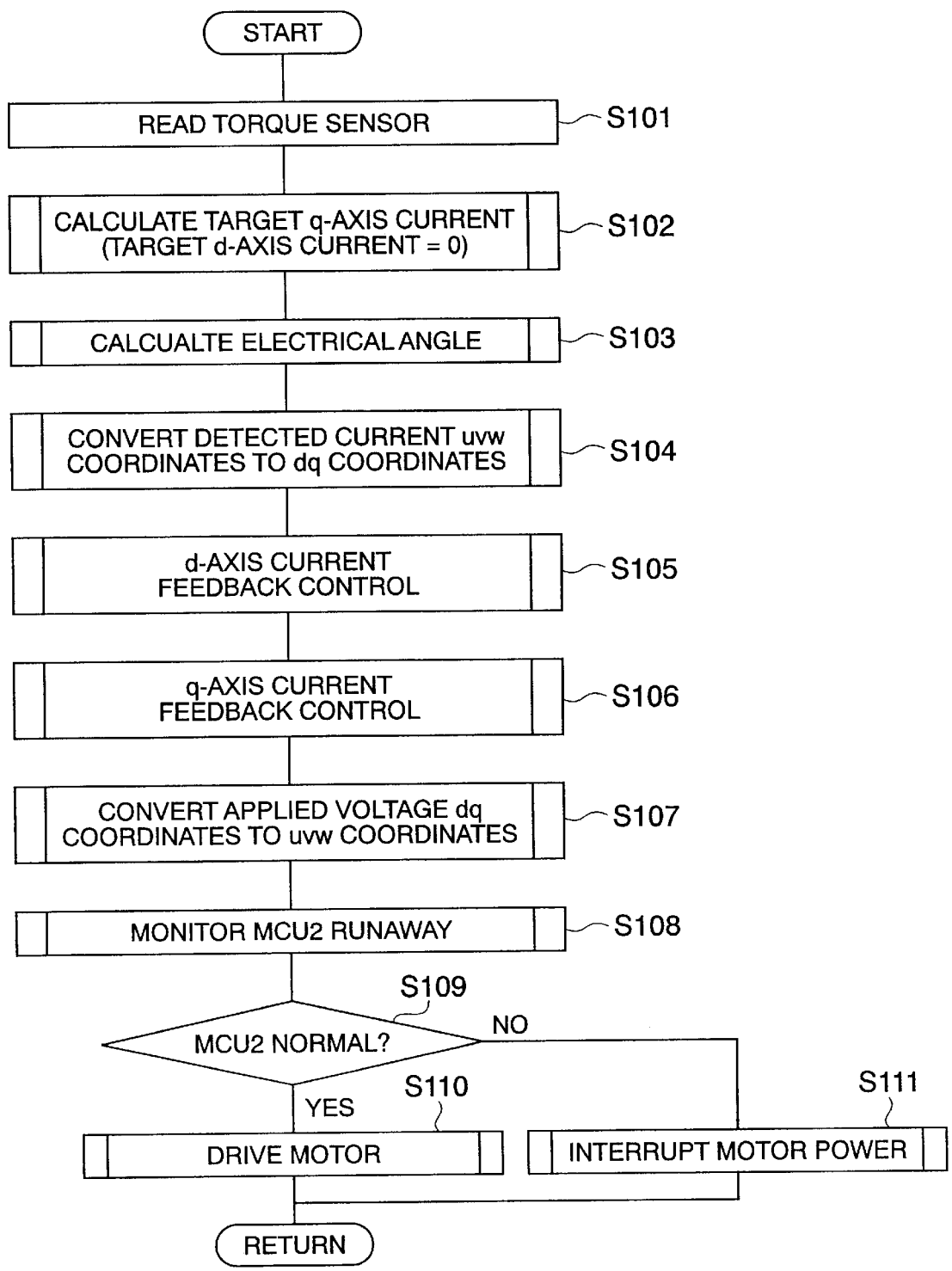
FIG. 2 is a flow chart to explain the operation of a first microcontroller according to Embodiment 1 of the present invention.
Figure 3:
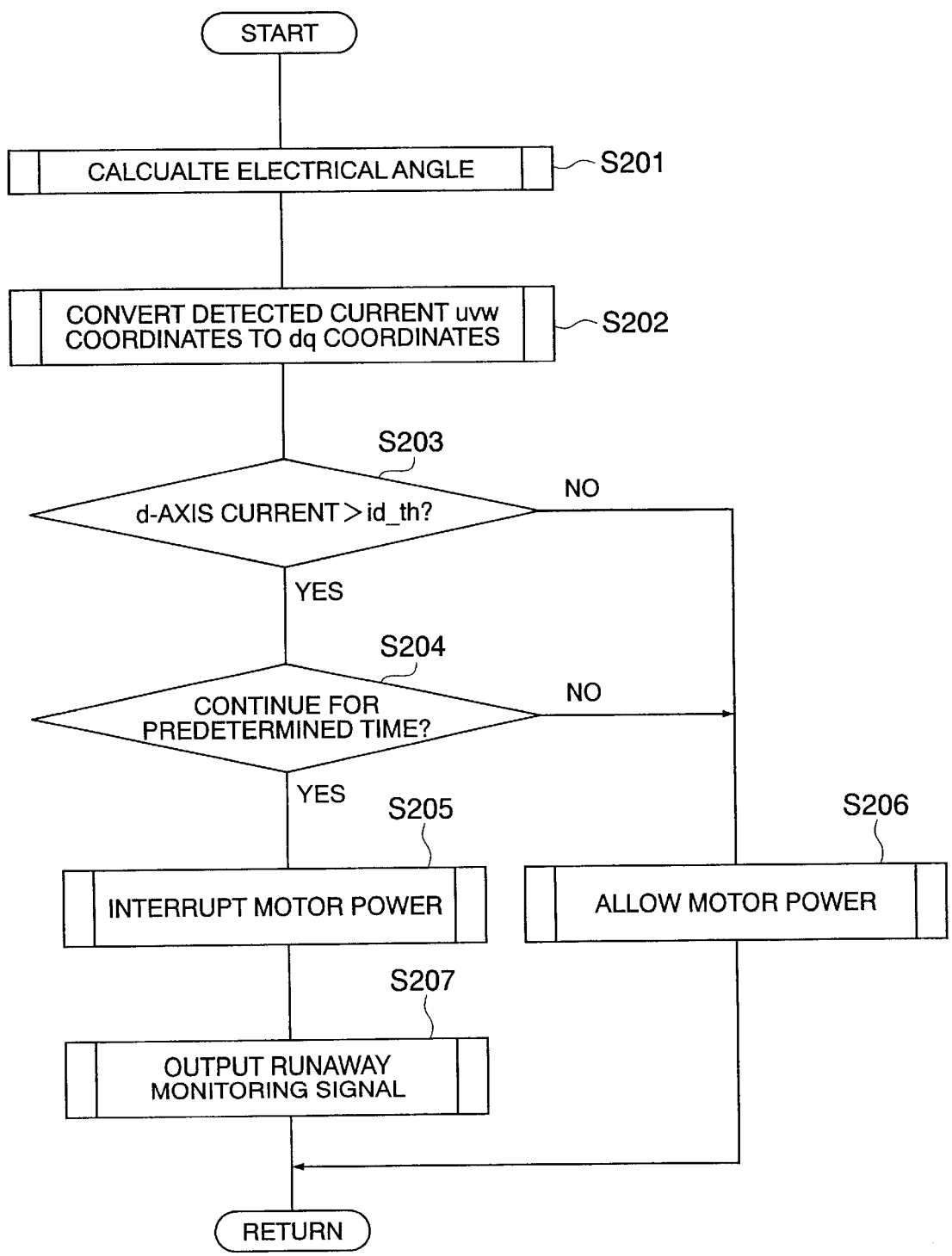
FIG. 3 is a flow chart to explain the operation of a second microcontroller according to Embodiment 1 of the present invention.

FIG. 2 is a flow chart to explain the operation of the first microcontroller 53 and FIG. 3 is a flow chart to explain the operation of the second microcontroller 54. The operation of the controller 5 will be explained based on the flow charts in FIG. 2 and FIG. 3 below.

The first microcontroller 53 is constructed of an A/D converter, a PWM timer, a ROM and a RAM, etc. which are not shown, and controls electric power steering. FIG. 2 is a flow chart to explain the operation of the main program thereof, which is intended to control the motor 2 at dq coordinates based on the steering effort detected by the torque sensor 1 and assist the driver in steering. Suppose this program is invoked periodically from a higher program.

Figure 4:
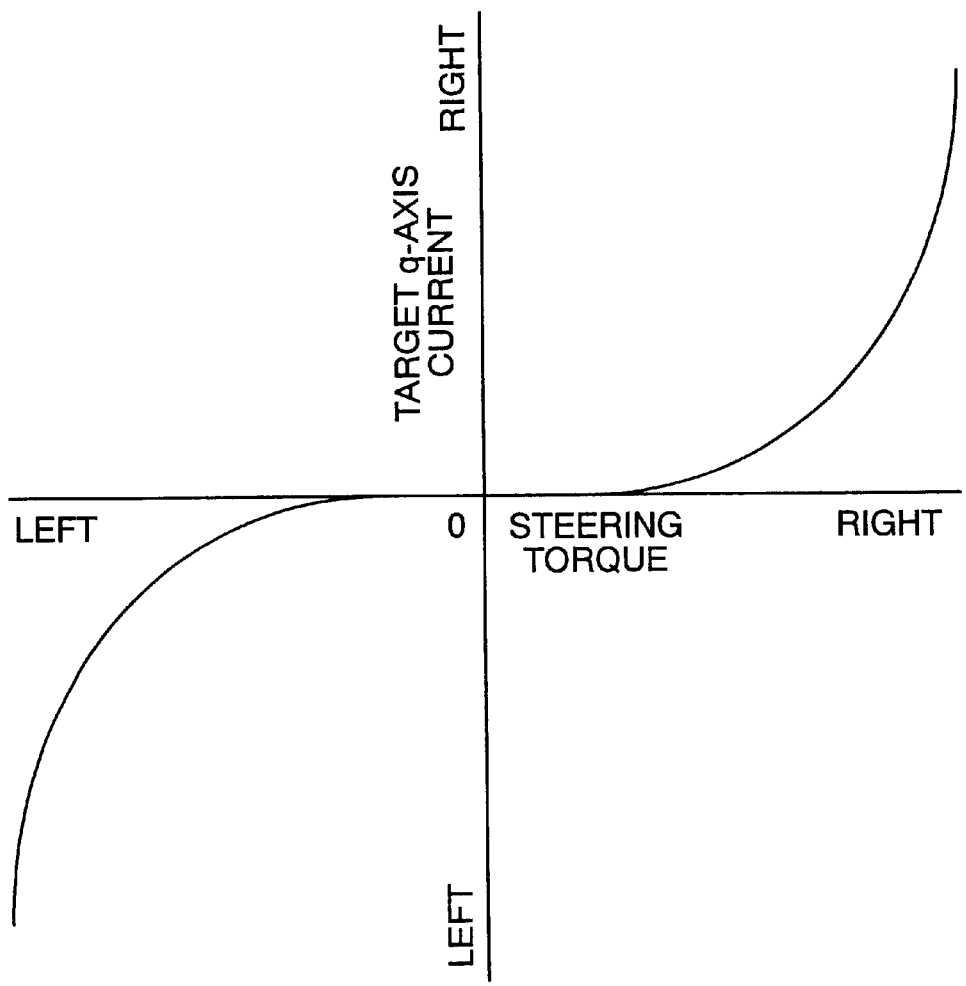
FIG. 4 is a drawing to explain the operation of Embodiment 1 of the present invention.

First, in step s101, the output of the torque sensor 1 is read via the input interface circuit 51. Then, in step s102, a target q-axis current is calculated according to the characteristic in FIG. 4, for example. Suppose the target d-axis current is 0. At this time, the q-axis current is proportional to the output torque of the motor 2 and therefore the vertical axis in FIG. 4 is equivalent to the motor output torque.

Then, in step s103, the electrical angle is calculated based on the rotor position sensor 3. Further, in step s104, the phase current detected by the current detection circuit 52 is converted to dq coordinates based on the electrical angle calculated above, and the d-axis current and q-axis current are calculated.

In steps s105 and s106, the target current at dq coordinates calculated in step s102 is subjected to feedback control through PI control, for example, so that the target current matches the detected current at dq coordinates calculated in step s104. Finally, in step s107, the applied voltage, which is the amount of operation of feedback control, is converted to uvw coordinates. Through the operation above, the operation of electric power steering is realized.

Furthermore, in step s108, when the operation of the second microcontroller 54 is monitored using a method which will be described later and the operation is judged normal in step s109, the pulse width of the voltage applied to the motor 2 is modulated in step s110 based on the calculation result in step s107, given to the motor drive circuit 56 via the logic circuit 55 and pre-driver 57 to drive the motor 2. On the other hand, in the event of an error, power to the motor 2 is interrupted in step s111.

The second microcontroller 54 is constructed of an A/D converter, a ROM and a RAM, etc., which are not shown, and operates as a parallel redundant system for the first microcontroller 53. FIG. 3 is a flow chart to explain the operation of the main program thereof, which is intended to interrupt power to the motor 2 when the current flowing into the motor 2 is judged to be abnormal. Suppose this program is periodically invoked from a higher program.

First, in step s201, an electrical angle is calculated based on the rotor position sensor 3. Then, in step s202, the phase current detected by the motor current detection circuit 52 is converted to dq coordinates based on the electrical angle above to obtain a d-axis current. Furthermore, in step s203, it is examined whether the d-axis current above is greater than a predetermined value id_th or not.

Here, id_th is a predetermined value in the same direction (positive direction) as the magnetic flux created by the field magnet. Generally, the d-axis current is controlled from the following two standpoints. (1) The d-axis current=0 is set to improve the efficiency. (2) The d-axis current is set to a negative predetermined value to increase the rotation speed. When the d-axis current is equal to or greater than a positive predetermined value id_th, neither (1) nor (2) above is established and the first microcontroller 53 is judged to be abnormal.

Therefore, if the d-axis current above is judged to be greater than the predetermined value id_th in step s203, and if it is judged in step s204 that this continues for a predetermined time, an instruction is output to the logic circuit 55 to interrupt power to the motor 2 in step s205. This condition continues until the first microcontroller 53 or the second microcontroller 54 is power-on reset. In the case where anomalies are encountered in the first microcontroller 53, this interrupts power to all switching elements that make up the motor drive circuit 56, taking a fail-safe action. On the other hand, if the d-axis current above is judged to be smaller than the predetermined value id_th in step s203, an instruction is output to the logic circuit 55 to allow power to the motor 2 in step s206.

Here, the operation in step s203 to s206 will be explained in detail.

When the first microcontroller 53 runs away out of control, a current flows into the stator irrespective of the position of the rotor. Thus, taking a case where power is fixed at a predetermined phase as an example, the influence of the runaway of the first microcontroller 53 on the operation of electric power steering will be explained.

Figure 5:
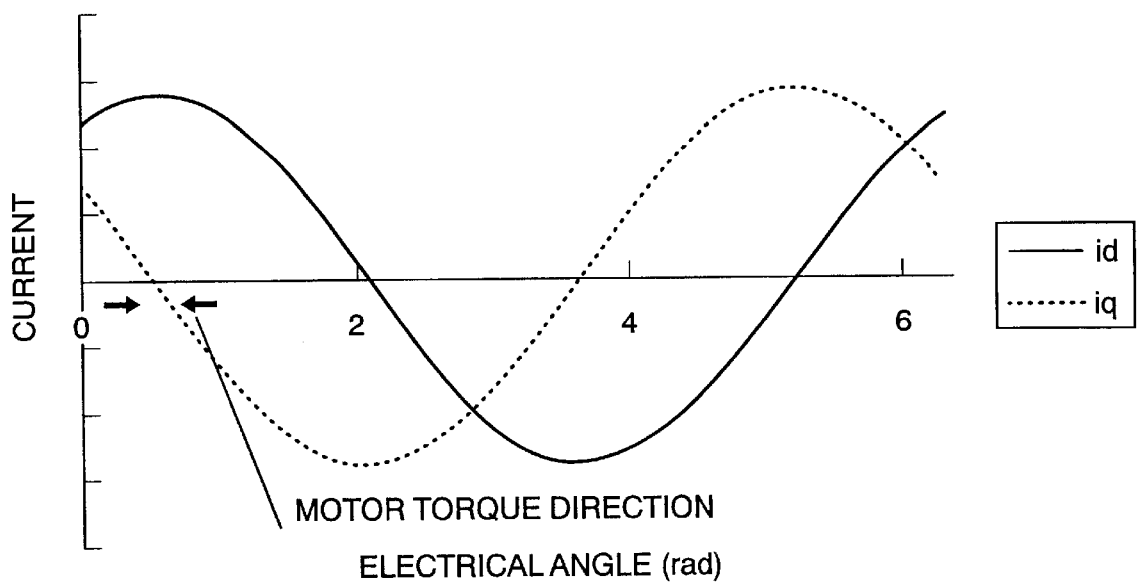
FIG. 5 is a drawing to explain the operation of Embodiment 1 of the present invention.

FIG. 5 shows a d-axis current id and q-axis current iq when the excited phase to be powered is fixed and the driver operates the steering wheel causing the rotor to rotate. As shown here, the d-axis current id and q-axis current iq change in a sinusoidal form with a phase difference of 90° according to the electrical angle. Here, iq is proportional to the output torque of the motor when the magnetic flux is constant and the polarity of the output torque of the motor 2 matches the polarity of iq. Thus, as indicated by the arrow in FIG. 5, at one point per electrical angle 360° where the d-axis current reaches a maximum in the direction of magnetic flux of the rotor, the rotor resists rotating neither to the right nor to the left and the steering effort is believed to be heavier than manual steering. Thus, the second microcontroller 54 detects this state and interrupts power to the motor 2.

The above-described operation is performed in steps s203 to s206 and the second microcontroller 54 calculates the current at d-q coordinates based on the rotor position sensor 3 and the motor current detection circuit 52 and interrupts power to the motor 2 irrespective of the instruction from the first microcontroller 53 when the d-axis current is judged to be equal to or greater than a predetermined value in the same direction as the magnetic flux created by the rotor.

Finally, in step s207, a square wave signal with a predetermined cycle is output so that the first microcontroller 53 can monitor the operation of the second microcontroller 54. When the cycle is abnormal, the first microcontroller 53 interrupts power to the motor 2 as described above. This also continues until either the first microcontroller 53 or the second microcontroller 54 is power-on reset.

As shown above, this embodiment allows a microcontroller redundant system appropriate for electric power steering to be constructed with an extremely small amount of calculation.

In the above description, an error in the first microcontroller 53 is judged with an absolute value of the d-axis current, but the maximum point of id above can also be judged using the ratio of the d-axis current id to the q-axis current iq, id/iq. In this case, an appropriate fail-safe action can be taken even with a value, which would be judged by the above method to be equal to or smaller than a threshold.

Moreover, all switching elements that make up the motor drive circuit 56 are interrupted in the event of an error, but it is also possible to interrupt only the power supply side or grounding side of the bridge circuit. In this case, it is possible to reduce by half the circuit scale of the logic circuit 55.

Figure 6:
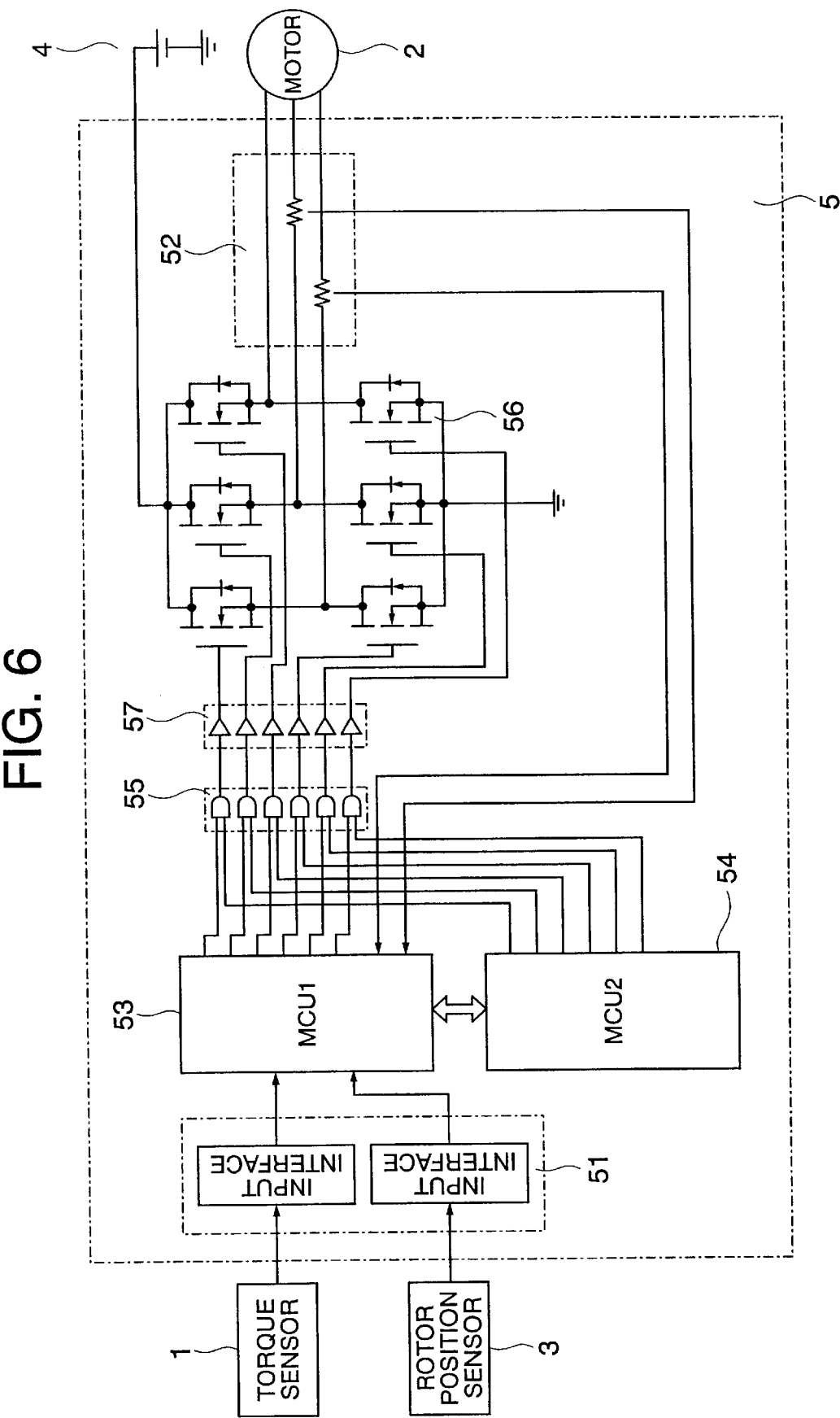
FIG. 6 is a block diagram showing another example of the electric power steering apparatus according to Embodiment 1 of the present invention.

Moreover, the motor current and electrical angle are directly input from each sensor to the second microcontroller 54, but it is also possible to receive them from the first microcontroller 53 by means of a communication. The hardware configuration in this case is shown in FIG. 6. In this case, it is possible to substitute a communication for the input signal processing of the rotor position sensor 3, etc. at the second microcontroller 54, reducing further the amount of calculation.

By the way, if the motor 2 is an induction machine, there is no need to detect the absolute position of the rotor, making it possible to use a rotor angular speed sensor such as an incremental type instead of the rotor position sensor 3 to construct a microcontroller redundant system in the same circuit configuration.

Second Embodiment

Figure 7:
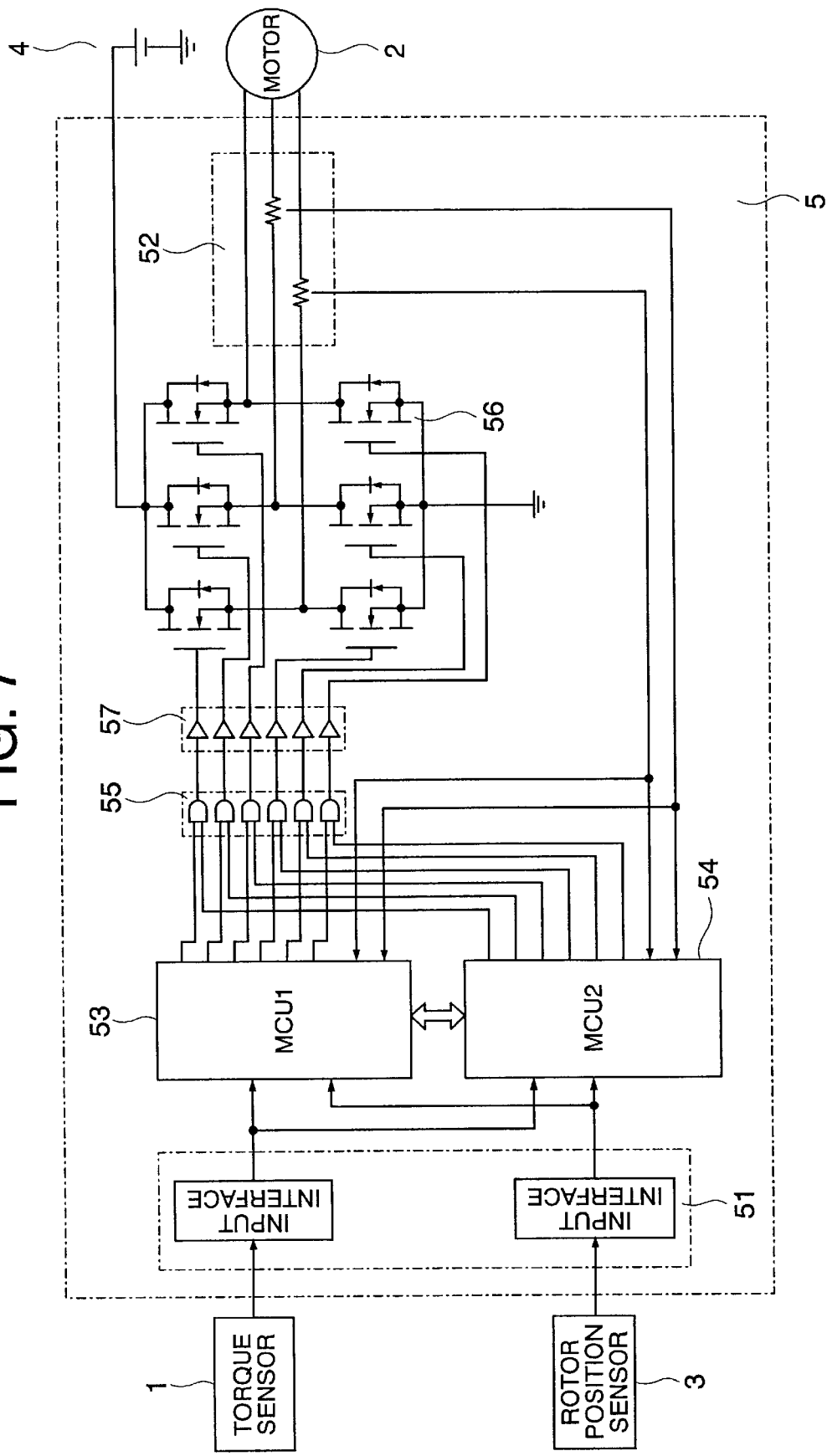
FIG. 7 is a block diagram showing an electric power steering apparatus according to Embodiment 2 of the present invention.

FIG. 7 is a block diagram showing an electric power steering apparatus according to Embodiment 2 of the present invention.

This embodiment shows an example of monitoring the operation more strictly than Embodiment 1 above. Embodiment 2 differs from Embodiment 1 in that the torque sensor 1 is connected to the first microcontroller 53.

Figure 8:
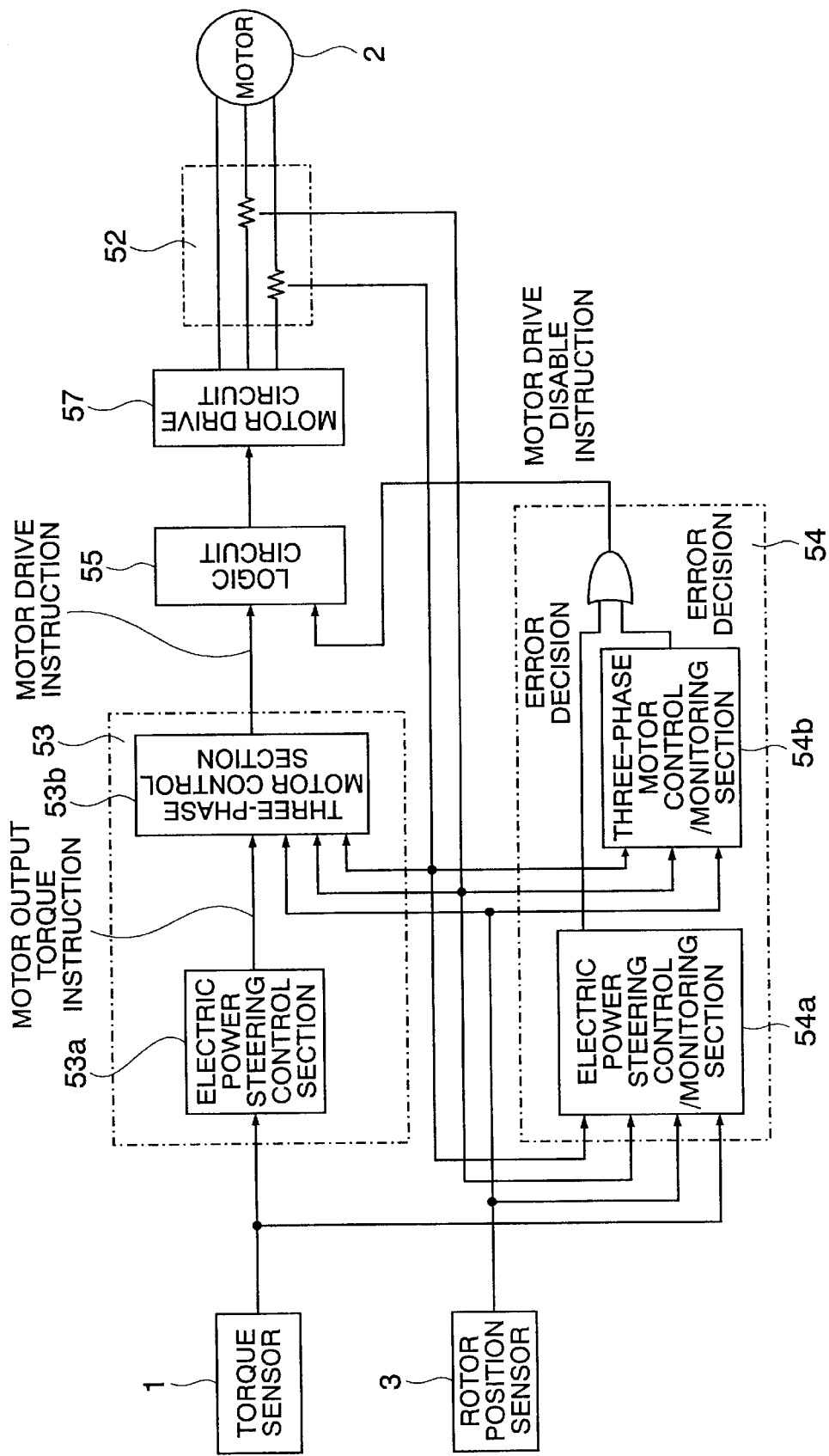
FIG. 8 is a functional block diagram showing a specific example of part of the electric power steering apparatus according to Embodiment 2 of the present invention.

FIG. 8 is a functional block diagram to explain a software configuration of this embodiment. In FIG. 8, the input interface circuit 51 in FIG. 7 is omitted and the motor drive circuit 56 and the pre-driver 57 that drives this are expressed as motor drive means.

The operation of this embodiment will be explained based on FIG. 8 below. The parts with the same functions as those in Embodiment 1 above are assigned the same reference numerals and explanations thereof will be omitted. As in the case of Embodiment 1 above, the processing of the first microcontroller 53 can be divided into two blocks; an electric power steering control section 53a and a three-phase motor control section 53b. This processing is the same as in Embodiment 1 above. That is, the electric power steering control section 53a calculates the output torque of the motor 2 according to, for example, the characteristic in FIG. 4 based on the output of the torque sensor 1, instructs it to the three-phase motor control section 53b and the three-phase motor control section 53b drives the motor 2 based on the motor current value detected by the motor current detection circuit 52 and the motor rotor position from the rotor position sensor 3 so that the motor output torque above is obtained.

On the other hand, the processing of the second microcontroller 54 consists of an electric power steering control/ monitoring section 54a that monitors calculation of the electric power steering control section 53a and a three-phase motor control/monitoring section 54b that monitors calculation of the three-phase motor control section 53b. The electric power steering control/monitoring section 54a compares the output signal of the torque sensor 1, the output signal of the motor current detection circuit 52 and the output signal of the magnetic pole position sensor 3, and thereby monitors whether the calculations at the electric power steering control section 53a are normal or not. The three-phase motor control/monitoring section 54b compares the output signal of the rotor position sensor 3 with the output signal of the motor current detection circuit 52 and thereby monitors whether the calculations at the three-phase motor control section 53b are normal or not.

Here, the electric power steering control/monitoring section 54a and three-phase motor control/monitoring section 54b will be explained in detail.

Figure 9:
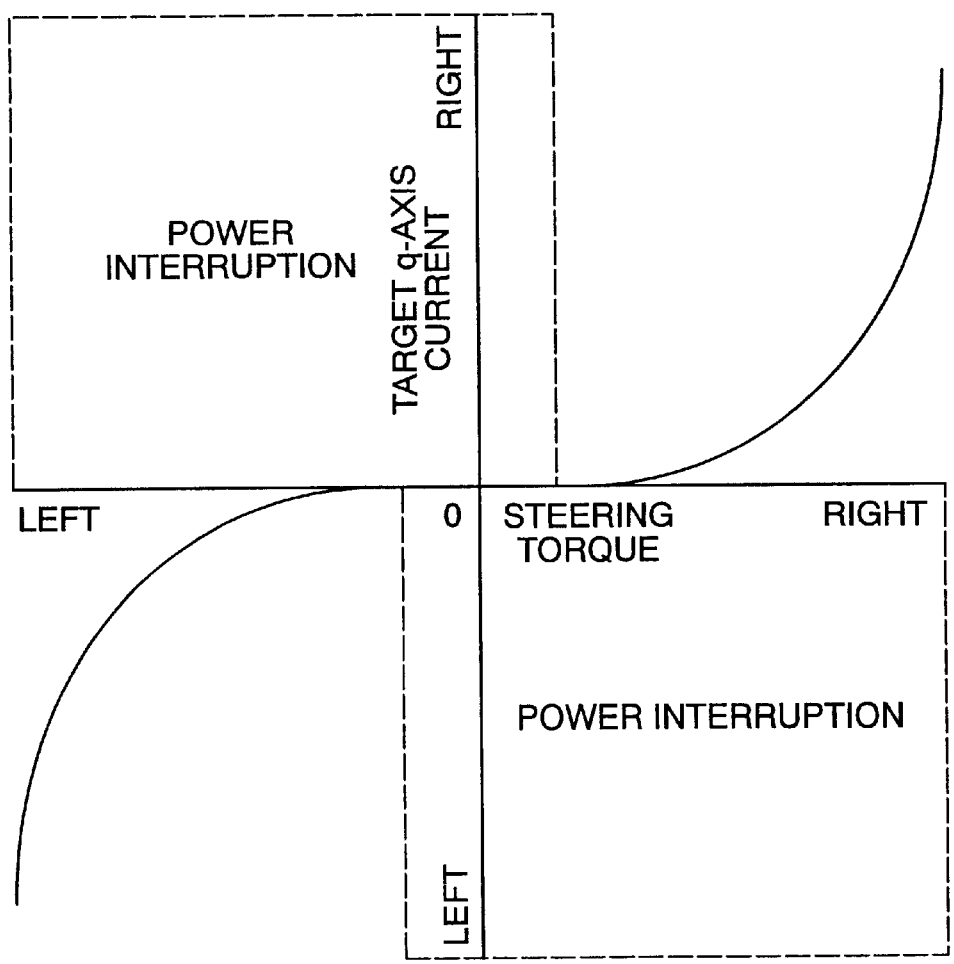
FIG. 9 is a drawing to explain the operation of Embodiment 2 of the present invention.

FIG. 9 is a drawing to explain the operation of the electric power steering control/monitoring section 54a. The vertical axis in FIG. 9 shows an indicated value of the q-axis current of the motor 2 and is equivalent to an indicated value of the motor output torque above. The electric power steering control/monitoring section 54a calculates the q-axis current from the phase current detected by the motor current detection circuit 52 and the rotor position detected by the rotor position sensor 3 and if the polarity of the q-axis current is different from the polarity of the value of the steering torque detected by the torque sensor 1, that is, when the direction of the steering torque does not match the direction in which the steering effort is assisted, the electric power steering control/monitoring section 54a instructs the logic circuit 55 to disable the power to the motor 2. As shown in FIG. 9, the area close to a neutral point of steering torque is a dead zone of steering effort assistance and no motor current flows, and therefore the electric power steering control/monitoring section 54a disables the power so that any motor current flows neither to the right nor to the left.

As in the case of Embodiment 1 above, the three-phase motor control/monitoring section 54b instructs the logic circuit 55 to interrupt drive to the motor based on the output signal of the rotor position sensor 2 and output signal of the motor current detection circuit 52. Moreover, as in the case of Embodiment 1 above, the first microcontroller 53 judges it as an error that the watchdog pulse cycle from the second microcontroller 54 extends. The above interruption instruction continues until a power-on reset.

As shown above, the first microcontroller 53 of the electric power steering apparatus of this embodiment also monitors the electric power steering control section of the first microcontroller 53, which is not monitored in Embodiment 1 above, and can thereby monitor the operation more strictly.

Figure 10:
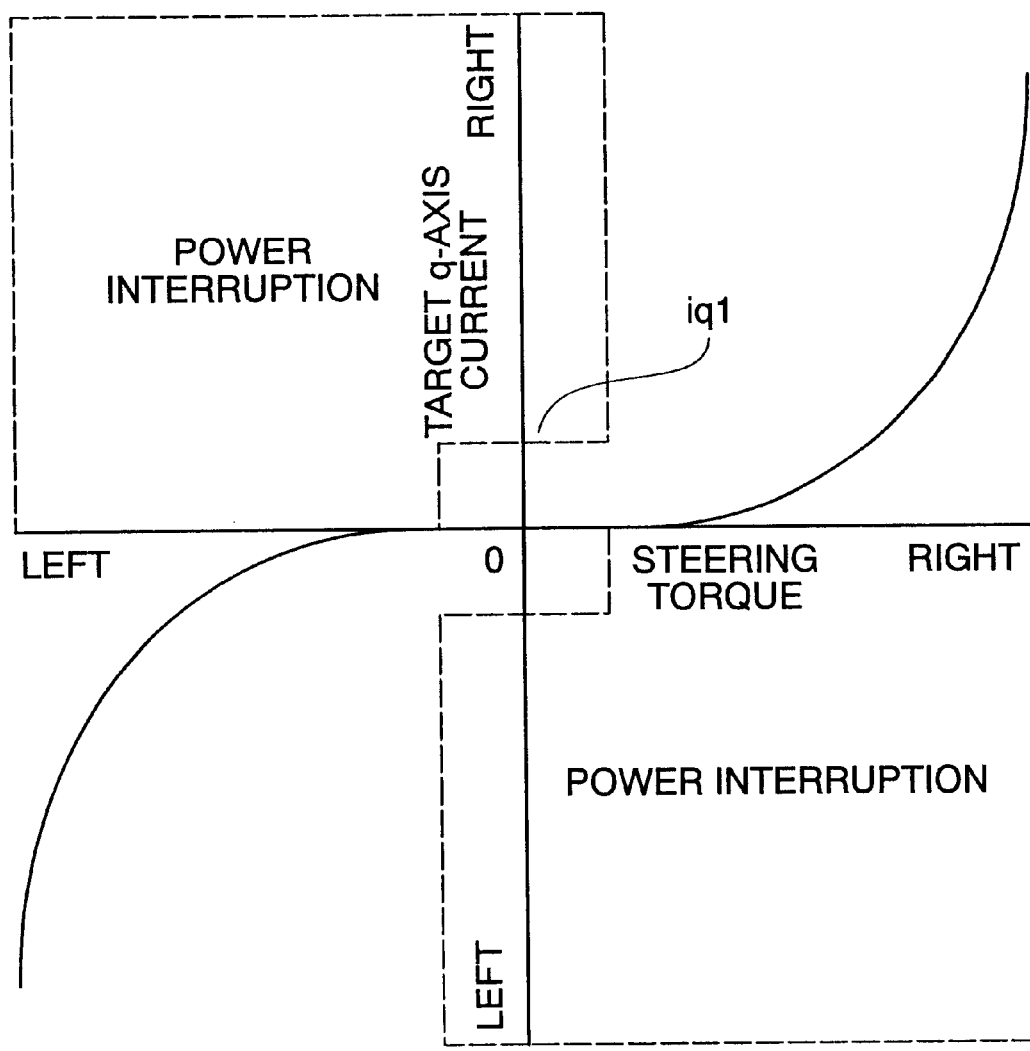
FIG. 10 is a drawing to explain the operation of Embodiment 2 of the present invention.

The electric power steering control/monitoring section 54a assumes that motor drive is prohibited in areas close to the neutral point of torque, but as shown in FIG. 10, it is also possible to adopt a configuration in which a micro q-axis current iq1 is allowed to be supplied in both directions. At this time, it is possible to drive the motor close to the neutral point of torque and compensate for friction of the motor, etc. and thereby improve the steering feeling. Moreover, the processing at the second microcontroller 54 can be limited only to the electric power steering control/monitoring section 54a. In this case, the processing becomes simpler and an inexpensive microcontroller can be used.

Third Embodiment

Figure 11:
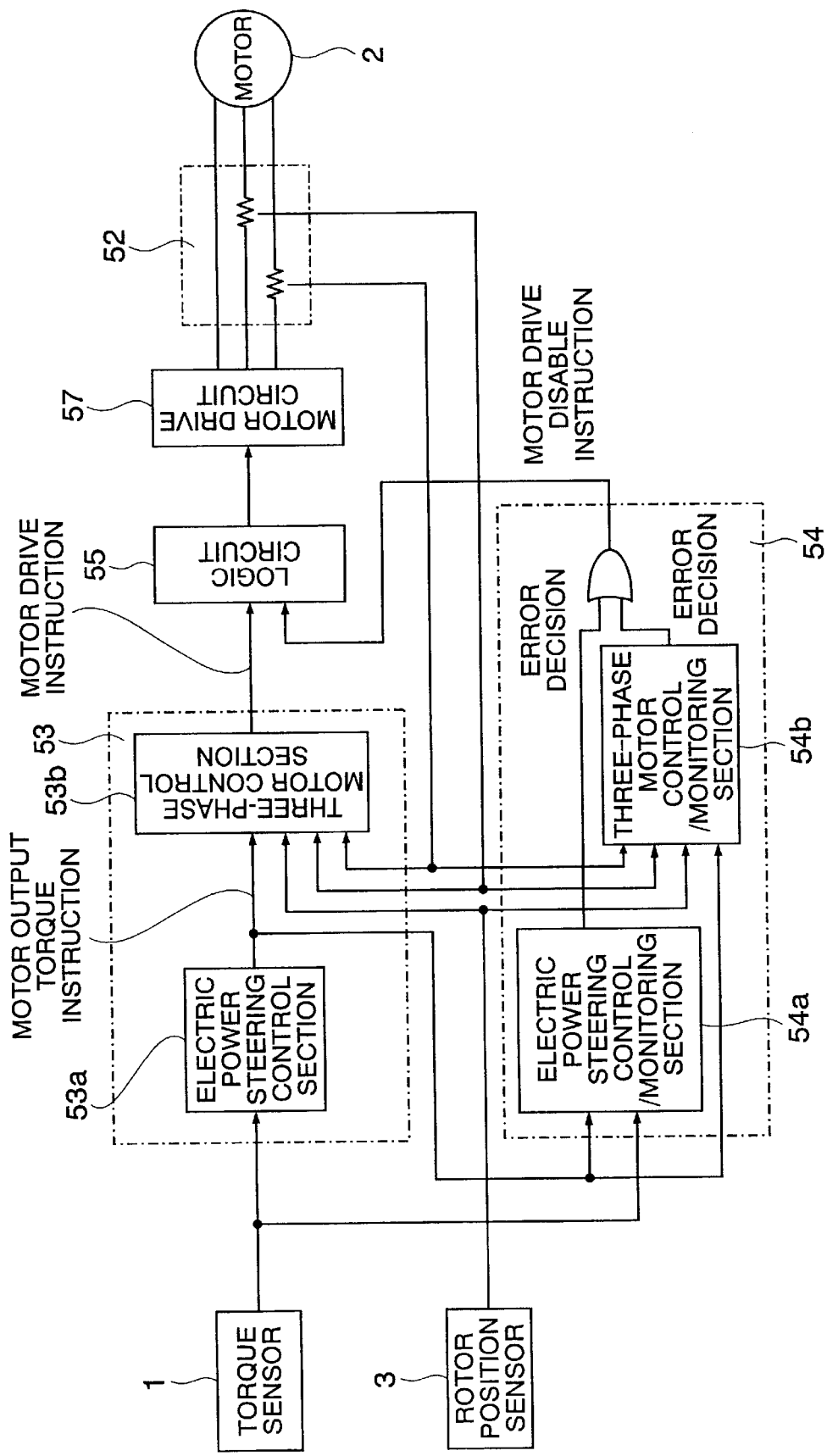
FIG. 11 is a functional block diagram showing an electric power steering apparatus according to Embodiment 3 of the present invention.

FIG. 11 is a block diagram showing an electric power steering apparatus according to Embodiment 3 of the present invention. In FIG. 11, the parts with the same functions as those in the Embodiment above are assigned the same reference numerals and explanations thereof will be omitted. As in the case of FIG. 8, in FIG. 11, the input interface circuit 51 is omitted and the motor drive circuit 56 and pre-driver 57 are expressed as motor drive means.

In Embodiments 1 and 2 above, the second microcontroller 54 calculates a current at dq coordinates from the output signal of the motor current detection circuit 52 and monitors the operation of the first microcontroller 53, but it is also possible to configure the second microcontroller 54 to communicate with the first microcontroller 53 and receive a current value at dq coordinates calculated by the first microcontroller 53. This allows the second microcontroller 54 to reduce the processing of converting the phase current to a q-axis current.

The operation of the electric power steering control/monitoring section 54a can be performed in the same way except that a target value of the q-axis current received from the first controller 53 is used instead of the q-axis current converted from the output signal of the motor current detection circuit 52. On the other hand, the processing of the three-phase motor control/monitoring section 54b can be the same as that in Embodiments 1 and 2, but it is also possible to compare the current at dq coordinates received from the first microcontroller 53 with the result of converting the output signal of the motor current detection circuit 52 to the dq coordinates.

Figure 12:
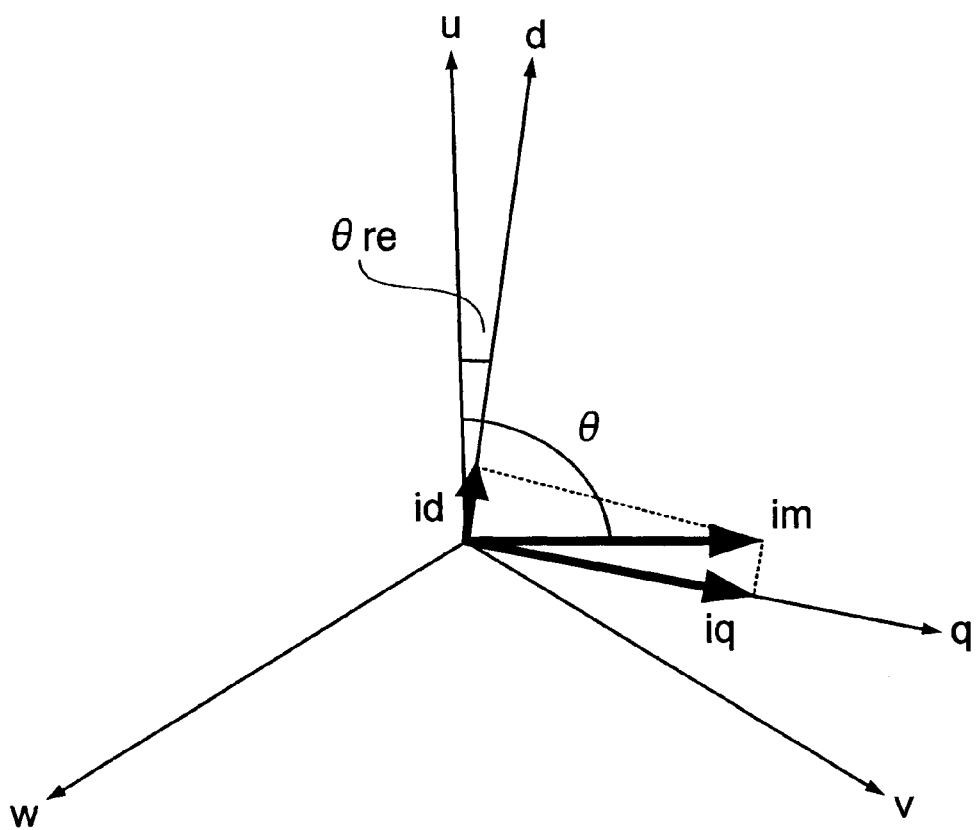
FIG. 12 is a drawing to explain the operation of Embodiment 3 of the present invention.

FIG. 12 is a drawing to explain the method of comparing the current at dq coordinates received from the first microcontroller 53 with the current at dq coordinates converted from the output signal of the motor current detection circuit 52.

The second microcontroller 54 calculates an absolute value |im| of the current vector and a phase angle θ thereof from an electrical angle θre of the rotor which is the output signal of the rotor position sensor 2 and the d-axis current id and the q-axis current iq received from the first microcontroller 53. On the other hand, the second microcontroller 54 converts the output signal of the motor current detection circuit 52 to dq coordinates. By comparing these two, it is possible to monitor the operation of the three-phase motor control section 53b of the first microcontroller 53.

It is also possible to compare only the three-phase AC coordinates and the current absolute value |im| at dq coordinates instead of comparing a current vector. In this case, θre is not necessary and the processing becomes simpler. Of course, it is also possible to compare only phase angle θ. Furthermore, the first microcontroller 53 is constructed to transmit/receive a target value at dq coordinates, but it is also possible to send the result of converting the value of phase current detected by the motor current detection circuit 52 to dq coordinates to the microcontroller 54.

On the other hand, the second microcontroller 54 can also receive one or all of the steering torque, electrical angle and phase current from the first microcontroller 53 by means of a communication. In case of transmitting/receiving all these items by means of a communication, the hardware configuration will be the same as that shown in FIG. 6, which will allow monitoring to be realized with a simpler hardware configuration.

Furthermore, in Embodiments 1 and 2 above, the first microcontroller 53 realizes mutual monitoring between the microcontrollers by monitoring a periodic signal sent out from the second microcontroller 54, but when data is transmitted/received by means of a communication as in the case of this embodiment, mutual monitoring can be performed by means of a communication. For example, when the cycle of data transmission from the first microcontroller 53 extends, the second microcontroller 54 can add processing of judging that anomalies are encountered in the first microcontroller 53. Moreover, when no acknowledge signal of completion of reception is returned from the second microcontroller 54, the first microcontroller 53 can judge that anomalies are encountered in the second microcontroller 54. The first microcontroller 53 can also add redundancy such as a checksum to the data sent/received and judge that anomalies are encountered in the second microcontroller 54 when an error is detected from the data.

Fourth Embodiment

Figure 13:
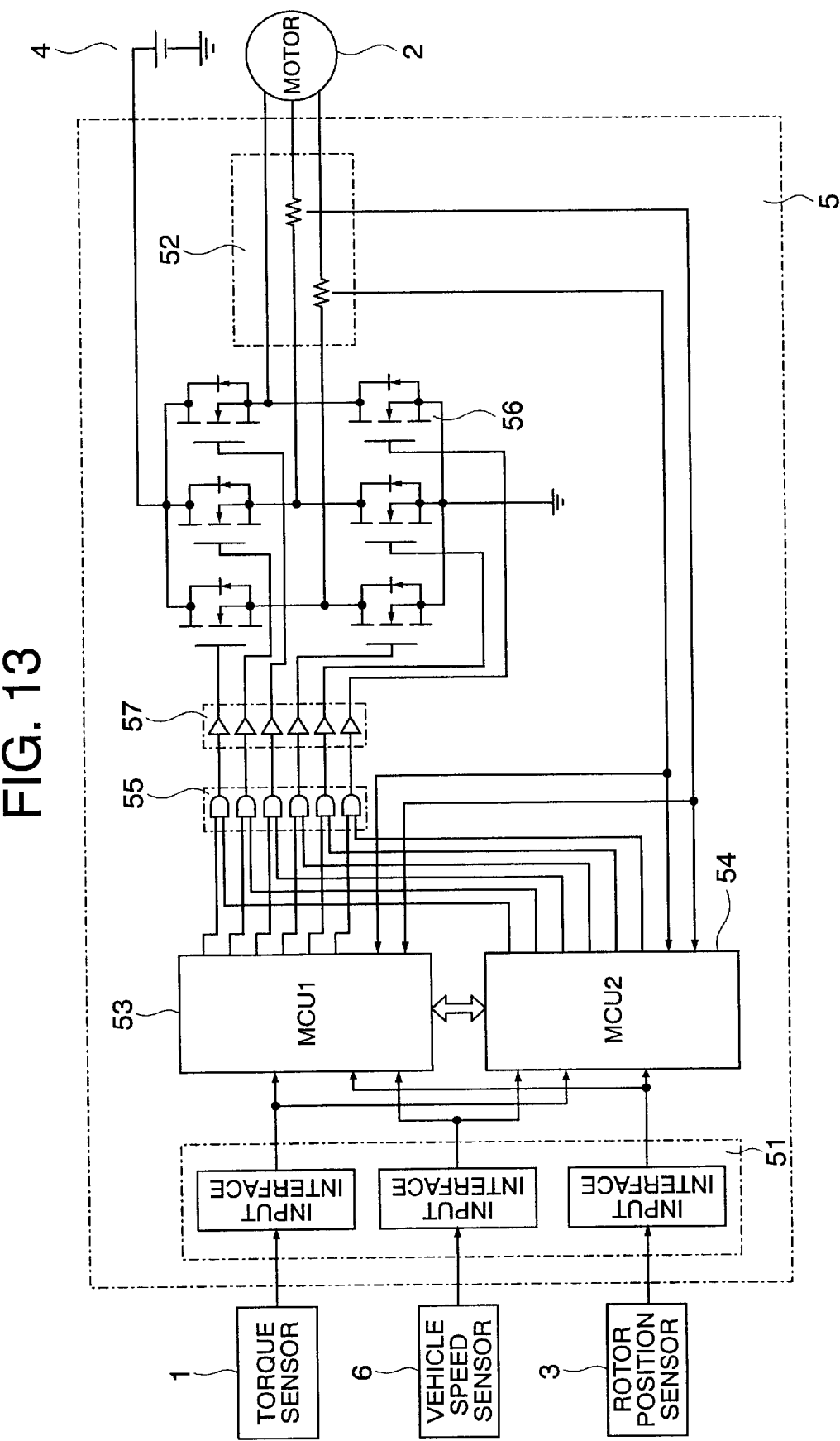
FIG. 13 is a block diagram showing an electric power steering apparatus according to Embodiment 4 of the present invention.

FIG. 13 is a block diagram showing an electric power steering apparatus according to Embodiment 4 of the present invention.

In the diagram, reference numeral 6 denotes a vehicle speed sensor to detect the traveling speed of a vehicle on which an electric power steering apparatus is mounted, which is connected to both the first microcontroller 53 and second microcontroller 54 via the input interface 51. The parts with the same functions as those in the Embodiment above are assigned the same reference numerals and explanations thereof will be omitted.

The electric power steering control/monitoring section 54a of the second microcontroller 54 of the embodiment above compares only the polarities of steering torque and motor output torque, but this embodiment also monitors the electric power steering control section more strictly.

Then, the operation will be explained below.

Embodiments 2 and 3 above compare the polarities of steering torque and motor output torque, but this embodiment monitors the operation of electric power steering more strictly by comparing the magnitude of steering torque and motor output torque.

Figure 14:
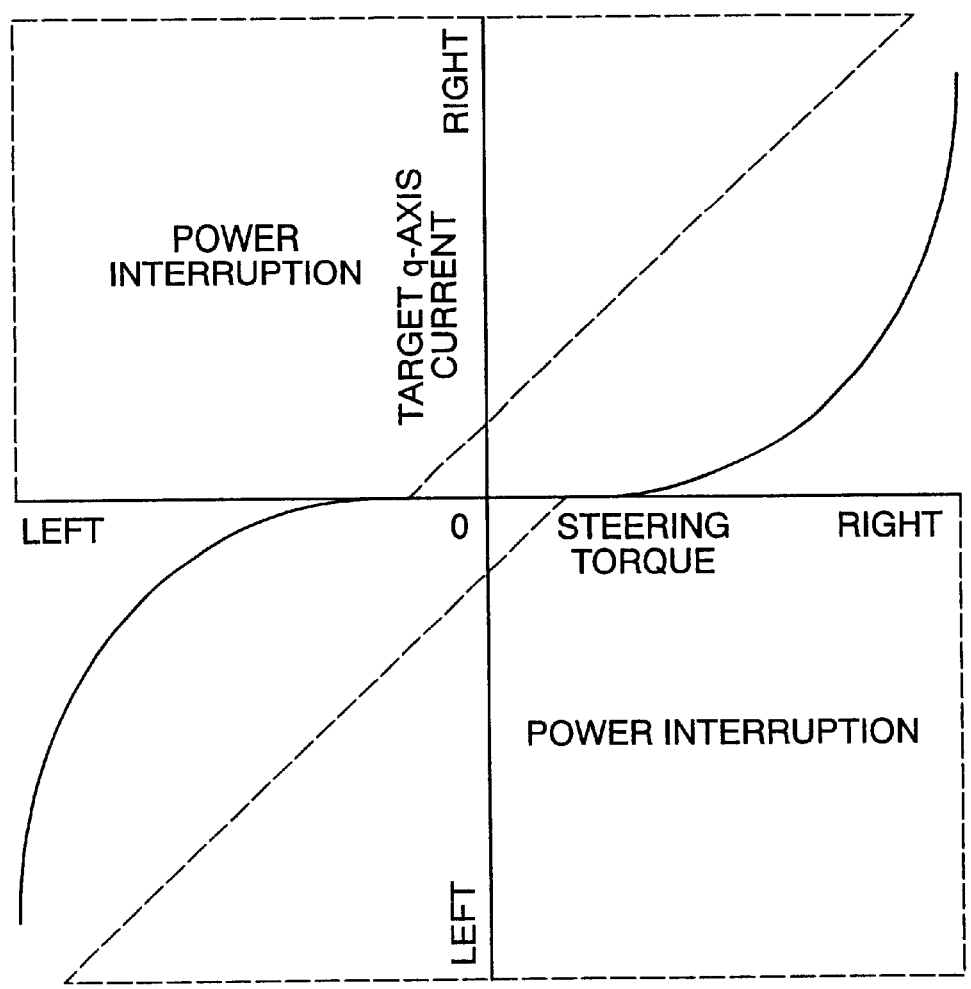
FIG. 14 is a drawing to explain the operation of Embodiment 4 of the present invention.

FIG. 14 illustrates the operation of this embodiment.

Motor output torque opposite to steering torque is disabled and at the same time excessive motor output torque is also disabled even if it has the same direction as steering torque. This prevents excessive assistance to steering effort. Of course, as in the case of the embodiment above, this embodiment can also have a characteristic that power is interrupted close to a neutral point of steering torque.

Moreover, vehicle speed calculation results are compared between the first microcontroller 53 and second microcontroller 54.

As shown above, this embodiment allows stricter monitoring of the electric power steering control section. By the way, it is a general practice that the steering effort assistance characteristic is sensitive to the vehicle speed, and therefore it is also possible to make the characteristic in FIG. 14 sensitive to the vehicle speed. This allows much stricter monitoring to be realized.

Fifth Embodiment

Figure 15:
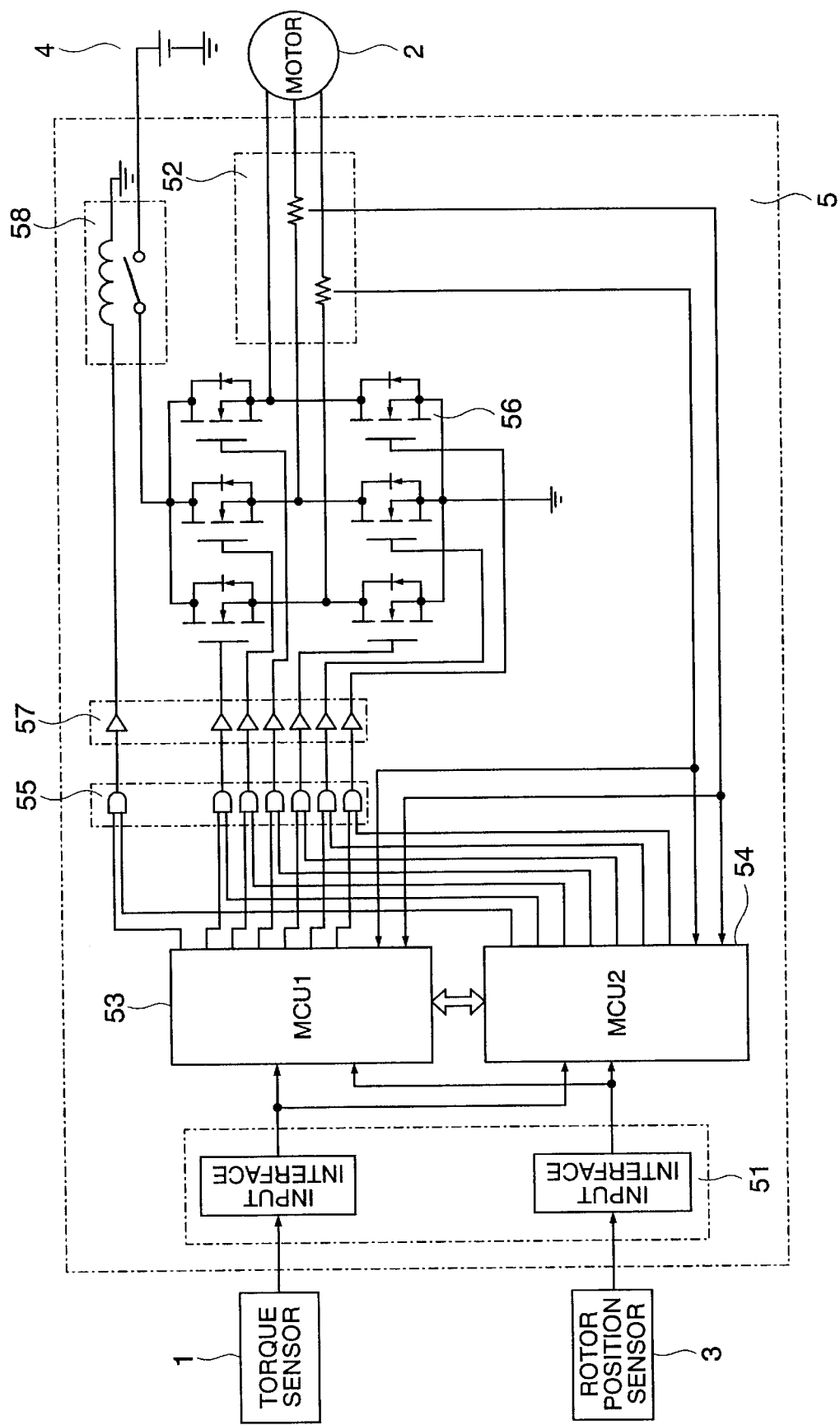
FIG. 15 is a block diagram showing an electric power steering apparatus according to Embodiment 5 of the present invention.
Figure 16:
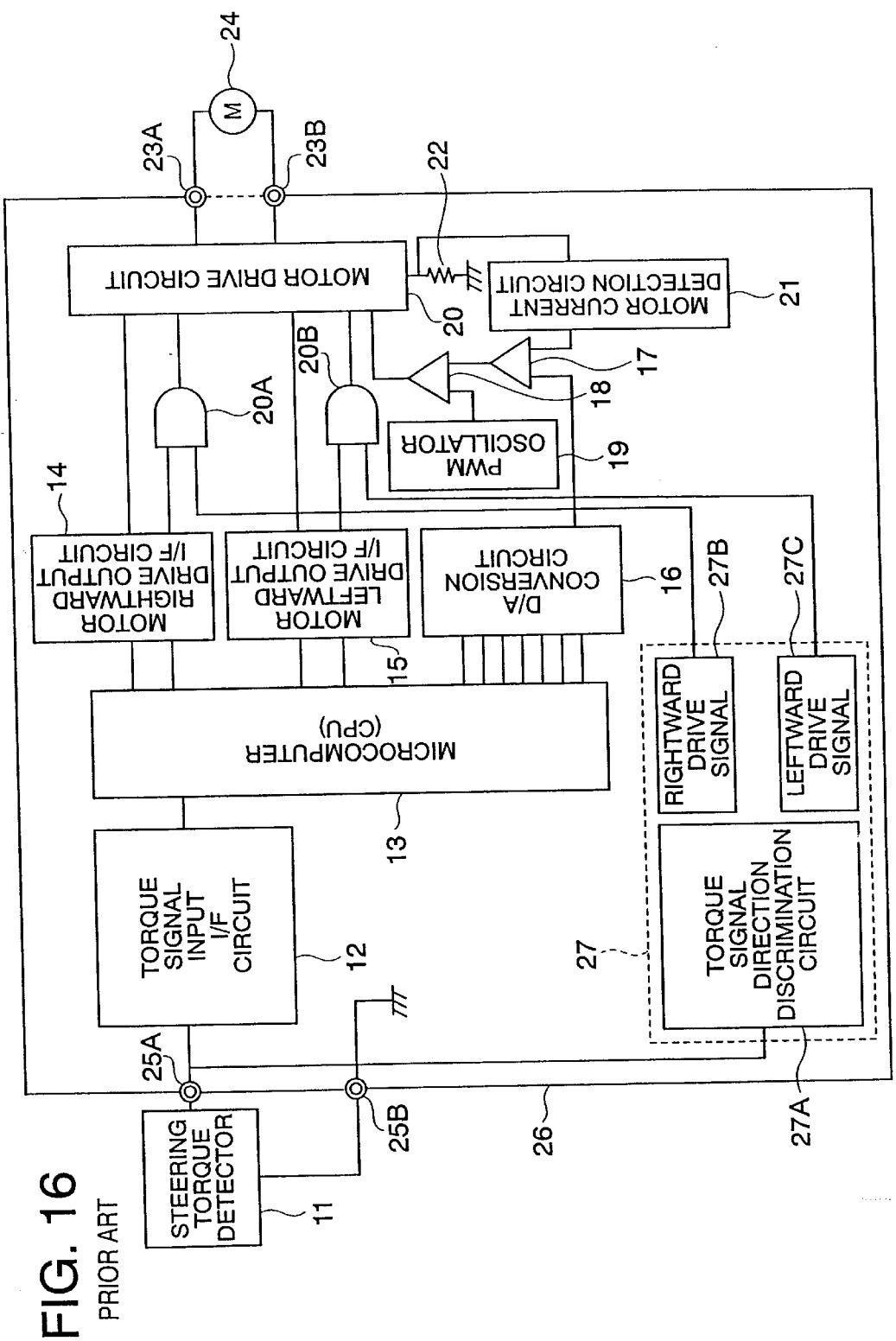
FIG. 16 is a block diagram showing a conventional electric power steering apparatus.

FIG. 15 is a block diagram showing an electric power steering apparatus according to Embodiment 5 of the present invention.

In the diagram, reference numeral 58 is a relay provided between the battery 4 and motor drive circuit 56 as switching means. The parts with the same functions as those in the Embodiment above are assigned the same reference numerals and explanations thereof will be omitted.

The embodiment above constructs the logic circuit 55 in such a way as to interrupt the motor drive circuit 57 in the event of an error, but the method is not limited to this if the power to the motor 2 can be interrupted.

For example, as shown in FIG. 15, a relay 58 is inserted between the battery 4 and motor drive circuit 56. The relay 58 is constructed in such a way that it can be driven via the logic circuit 55 and pre-driver 57 and disconnected by an instruction from either the first microcontroller 53 or second microcontroller 54. This configuration allows the power to the motor 2 to be interrupted more reliably.

Adopting a configuration in which the power to the motor 2 is interrupted not by the motor drive circuit 56 but by only the relay 58 makes it possible to reduce the circuit scale of the logic circuit 55. The relay 58 can also be inserted between the motor drive circuit 56 and motor 2. In this embodiment, the switching means is incorporated in the controller 5, but the switching means can also be placed outside the controller.

Embodiments 1 to 5 above describe the case where the present invention is applied to electric power steering, but the present invention is not limited to this, and can also be applied to steering by wire, etc. and can thereby provide a highly reliable steering control apparatus.

What is claimed is:

1. An electric power steering apparatus, comprising:
   a multi-phase motor that assists steering effort of a driver;
   driving means provided with an upper switching element that connects or disconnects the winding of each phase of said multi-phase motor and a power supply, and a lower switching element that connects or disconnects the winding of each phase of said multi-phase motor and grounding; and
   a logic circuit that determines ON/OFF of said upper switching element and said lower switching element;
   first and second controlling means for controlling said driving means via said logic circuit,
   wherein said logic circuit determines ON/OFF of said upper switching element and said lower switching element so that the power to the winding of said each phase is stopped according to an instruction of either said first control means or said second control means, and
   wherein said first controlling means and said second controlling means are connected in such a way as to exchange predetermined data, monitor errors of each other based on the exchanged data and control said logic circuit in such a way as to interrupt the power to said multi-phase motor in the event of an error in said first or second controlling means.

2. The electric power steering apparatus according to claim 1,
   further comprising a torque sensor that detects steering effort of the driver, wherein said torque sensor is connected to both of said first controlling means and said second controlling means, or said torque sensor is connected to said first controlling means and said first controlling means is connected to said second controlling means to send a value of steering torque detected by said torque sensor to said second controlling means.

3. The electric power steering apparatus according to claim 1,
   further comprising a motor current detection circuit that detects a current of said multi-phase motor, wherein said motor current detection circuit is connected to both of said first controlling means and said second controlling means, or said motor current detection circuit is connected to said first controlling means and said first controlling means is connected to said second controlling means to send a detected current based on a target current or a detected current based on said current detection circuit to said second controlling means.

4. The electric power steering apparatus according to claim 1,
   further comprising a rotor position sensor that detects the position of the rotor of said multi-phase motor, wherein said rotor position sensor is connected to both of said first controlling means and said second controlling means, or said rotor position sensor is connected to said first controlling means and said first controlling means is connected to said second controlling means to send the detected position based on said position sensor to said second controlling means.

5. The electric power steering apparatus according to claim 4,
   further comprising a speed sensor that detects the rotation speed of the rotor of said multi-phase motor, wherein said speed sensor is connected to both of said first controlling means and said second controlling means, or said speed sensor is connected to said first controlling means and said first controlling means is connected to said second controlling means to send the detected position based on said position sensor to said second controlling means.

6. The electric power steering apparatus according to claim 1,
   further comprising a vehicle speed sensor that detects the traveling speed of the vehicle on which said electric power steering apparatus is mounted, wherein said vehicle speed sensor is connected to both of said first controlling means and said second controlling means, or said speed sensor is connected to said first controlling means and said first controlling means is connected to said second controlling means.

7. The electric power steering apparatus according to claim 1,
   wherein said logic circuit is constructed to turn OFF at least one of said upper switching element and said lower switching element based on the instruction of either said first controlling means or said second controlling means.

8. The electric power steering apparatus according to claim 1,
   wherein said driving means comprises at least:
      an upper switching element that connects or disconnects the winding of each phase of said multi-phase motor and a power supply;
      a lower switching element that connects or disconnects the winding of each phase of said multi-phase motor and grounding; and
      switching means for connecting or disconnecting said upper or lower switching element and a power supply or ground,
      wherein said logic circuit is constructed to turn OFF said switching means based on the instruction of either said first controlling means or said second controlling means.

9. The electric power steering apparatus according to claim 1,
   wherein said driving means comprises at least:
      an upper switching element that connects or disconnects the winding of each phase of said multi-phase motor and a power supply;
      a lower switching element that connects or disconnects the winding of each phase of said multi-phase motor and ground; and
      switching means for connecting or disconnecting the winding of each phase of said multi-phase motor and said upper or lower switching element, wherein said logic circuit is constructed to turn OFF said switching means based on the instruction of either said first controlling means or said second controlling means.

10. The electric power steering apparatus according to claim 1, wherein said second controlling means controls said logic circuit in such a way as to interrupt the power to said multi-phase motor in the case where the direction of steering torque does not match the direction of assisting steering effort, and to interrupt the power to said multi-phase motor in the case where steering torque is close to a neutral point whichever direction the steering effort of the driver is assisted.

11. The electric power steering apparatus according to claim 1, wherein said second controlling means controls said logic circuit in such a way as to interrupt the power to said multi-phase motor in the case where the direction of steering torque does not match the direction of assisting steering effort, and not to interrupt the power to said multi-phase motor in the case where steering torque is close to a neutral point whichever direction the steering effort of the driver is assisted.

12. The electric power steering apparatus according to claim 1, wherein said second controlling means controls said logic circuit in such a way as to interrupt the power to said multi-phase motor in the case where the motor output torque is excessive to the steering torque.

13. The electric power steering apparatus according to claim 1, wherein said second controlling means controls said logic circuit in such a way as to interrupt the power to said multi-phase motor in the case where the relationship between the motor current at orthogonal coordinates and the motor current at three-phase AC coordinates is judged to be abnormal.

14. The electric power steering apparatus according to claim 1, wherein said second controlling means controls said logic circuit in such a way as to interrupt the power to said multi-phase motor in the case where the relationship between the motor current at orthogonal coordinates, the motor current at three-phase AC coordinates and electrical angle is judged to be abnormal.

15. The electric power steering apparatus according to claim 1, wherein said second controlling means controls said logic circuit in such a way as to interrupt the power to said multi-phase motor in the case where the component of the motor current in the same direction as the magnetic flux created by the magnetic field is judged to be abnormal.

16. The electric power steering apparatus according to claim 1, wherein said second controlling means controls said logic circuit in such a way as to interrupt the power to said multi-phase motor in the case where the phase angle formed by the current component of the motor current in the same direction as the magnetic flux created by the magnetic field and by the current component in the direction 90° from the magnetic flux created by the magnetic field is judged to be abnormal.

17. The electric power steering apparatus according to claim 1, wherein said logic circuit is controlled in such a way as to interrupt the power to said multi-phase motor when the condition for interrupting the power to said multi-phase motor continues for a predetermined time.

18. The electric power steering apparatus according to claim 1, wherein when an operation of said motor is judged abnormal, interruption of the power to said multi-phase motor is continued until said first controlling means or said second controlling means is power-on reset.

* * * * *